United States Patent
Bruck

(10) Patent No.: US 8,506,014 B2
(45) Date of Patent: Aug. 13, 2013

(54) LATCH MECHANISM WITH ENGAGEMENT TEETH FOR CONNECTING A PIVOTAL SEATBACK TO A SIDE PILLAR LOCATION OF A VEHICLE INTERIOR

(75) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 372 days.

(21) Appl. No.: 13/010,832

(22) Filed: Jan. 21, 2011

(65) Prior Publication Data

US 2011/0175420 A1   Jul. 21, 2011

Related U.S. Application Data

(60) Provisional application No. 61/296,983, filed on Jan. 21, 2010.

(51) Int. Cl.
*B60N 2/02* (2006.01)

(52) U.S. Cl.
USPC ................................... 297/378.13

(58) Field of Classification Search
USPC ............. 297/378.13, 378.1, 378.12, 376
See application file for complete search history.

(56) References Cited

U.S. PATENT DOCUMENTS

| | | | |
|---|---|---|---|
| 4,067,611 A | 1/1978 | Kurozu et al. | |
| 4,561,694 A | 12/1985 | Mouri et al. | |
| 4,904,003 A | 2/1990 | Yamazaki et al. | |
| 5,879,043 A | 3/1999 | Radue et al. | |
| 6,132,000 A | 10/2000 | Tanaka | |
| 6,312,055 B1 | 11/2001 | Uematsu | |
| 6,341,820 B1 | 1/2002 | Kimura et al. | |
| 6,769,741 B2 | 8/2004 | Denning | |
| 6,811,199 B2 | 11/2004 | Nozaki | |
| 7,032,973 B2 | 4/2006 | Reubeuze | |
| 7,377,584 B2 | 5/2008 | Griswold et al. | |
| 7,484,807 B2 | 2/2009 | Okazaki et al. | |
| 7,641,282 B2 * | 1/2010 | Hinata et al. ............. | 297/216.14 |
| 8,146,996 B2 * | 4/2012 | Vedder et al. ............. | 297/378.13 |
| 2008/0061617 A1 | 3/2008 | Zielinski et al. | |
| 2008/0129017 A1 | 6/2008 | Okazaki et al. | |

FOREIGN PATENT DOCUMENTS

| | | |
|---|---|---|
| EP | 0741055 A2 | 11/1996 |
| GB | 2095984 A | 10/1982 |

* cited by examiner

*Primary Examiner* — Milton Nelson, Jr.
(74) *Attorney, Agent, or Firm* — Gifford, Krass, Sprinkle, Anderson & Citkowski, P.C.; Douglas J. McEvoy

(57) ABSTRACT

A recline mechanism incorporated into a rear row seat and including a latch plate fixed to an interior location of the vehicle. A body is supported in displaceable fashion along locations associated with the latch plate and exhibits an outwardly facing striker engaged by a hook component configured into an opposing side location of a pivotal seatback in order to selectively pivotally slave the seatback to the mechanism. A cable release component is supported on the body and operates to actuate a pivot element exhibiting biased fingers likewise supported on the body from a first position in engagement with the latch plate to a second position permitting the seatback to pivot an angular distance within an overall range defined by the latch plate.

14 Claims, 3 Drawing Sheets

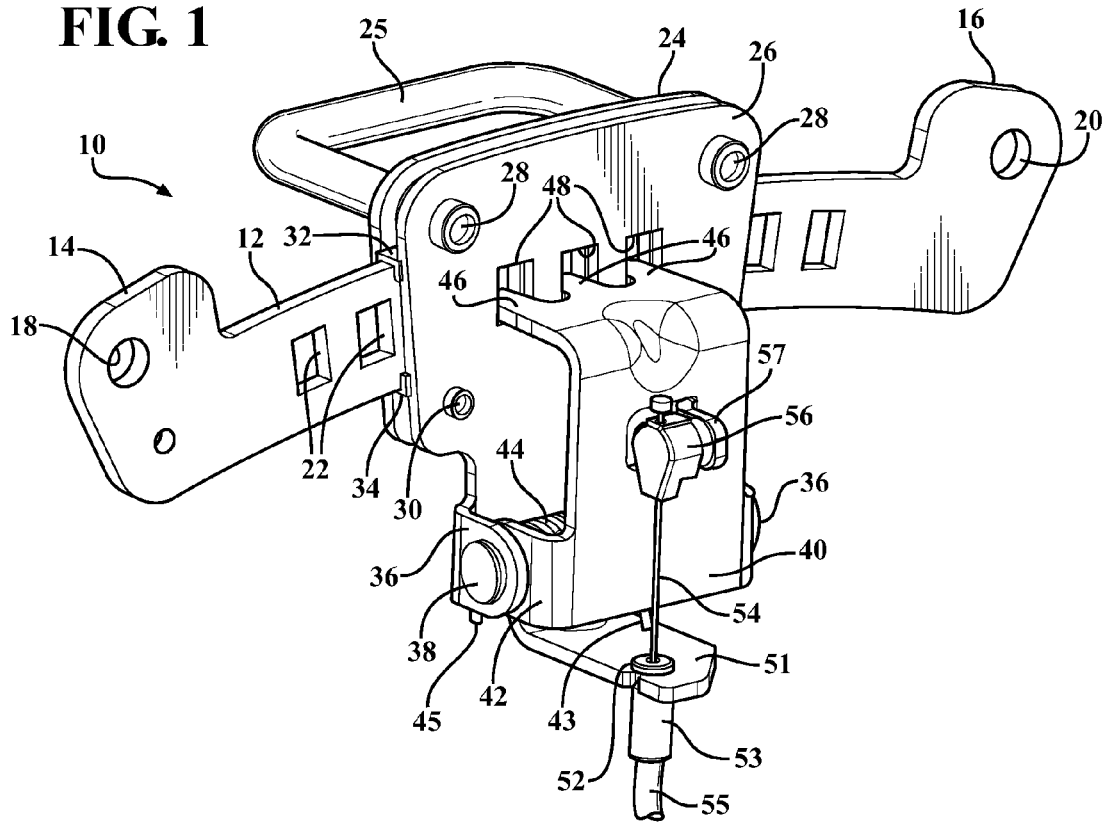

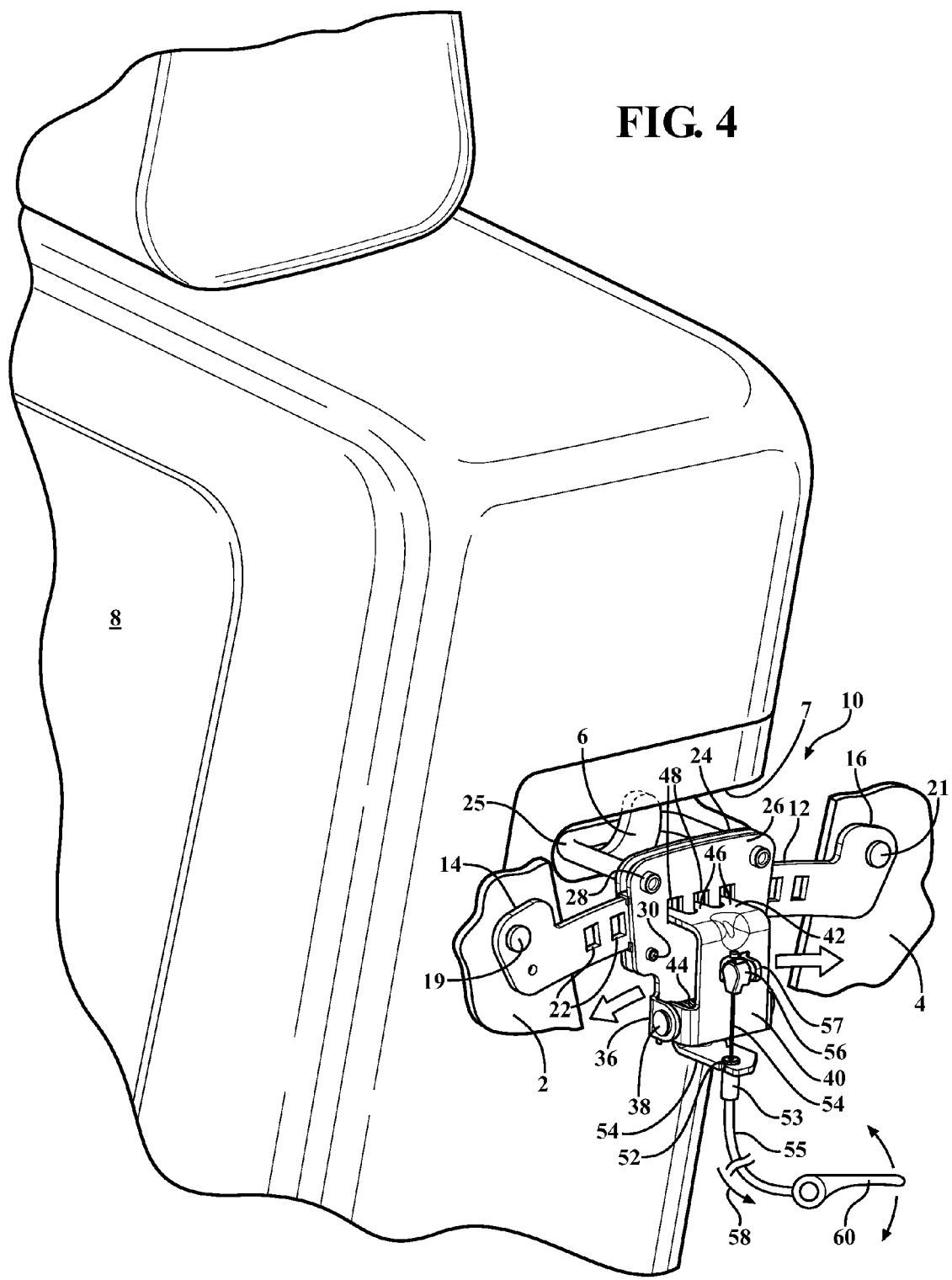

LATCH MECHANISM WITH ENGAGEMENT TEETH FOR CONNECTING A PIVOTAL SEATBACK TO A SIDE PILLAR LOCATION OF A VEHICLE INTERIOR

CROSS-REFERENCE TO RELATED APPLICATIONS

This application claims the benefit of U.S. Provisional Application 61/296,983 filed on Jan. 21, 2010.

FIELD OF THE INVENTION

The present invention discloses a side pillar mounted, elongated and teethed latch plate, in combination with a displaceable body mounted to the latch plate. The displaceable body exhibits an outwardly facing striker engaged by a hook component configured into an opposing side location of a pivotal seatback in order to selectively pivotally slave the seatback to the mechanism. A cable release component is incorporated into the body and operates to disengage biased fingers from selected teethed locations of the latch plate to permit the slaved seatback to pivot an angular distance within an overall range equivalent to the length of the teethed sector associated with the latch plate.

DESCRIPTION OF THE PRIOR ART

The prior art is documented with examples of seatback locking and adjustment mechanisms, such as which are incorporated into a side pillar or fixed vehicle interior location and to which the seatback is pivotally slaved. Examples of such assemblies include those set forth in Griswold, U.S. Pat. No. 7,377,584 (articulating high latch for a seat), Uematsu, U.S. Pat. No. 6,312,055 (lock device of seatback), UK 2 095 984 (vehicle seat with movable backs), and Denning, U.S. Pat. No. 6,769,741 (seat arrangement including adjustable latch and rigid striker). Other references of note include Okazaki, U.S. Pat. No. 7,484,807 which teaches a seat reclining apparatus with rail member attached to the vehicle body approximating a curve, a slider being attached to the rail member and in turn securing a striker facing a recessed portion of the lock member incorporated into the seatback frame.

SUMMARY OF THE PRESENT INVENTION

The present invention discloses a recline mechanism incorporated into a rear row seat and including a latch plate fixed to an interior location of the vehicle. A body is supported in displaceable fashion along locations associated with the latch plate and exhibits an outwardly facing striker engaged by a hook component configured into an opposing side location of a pivotal seatback in order to selectively pivotally slave the seatback to the mechanism. A cable release component is supported on the body and operates to actuate a pivot element exhibiting biased fingers likewise supported on the body from a first position in engagement with the latch plate to a second position permitting the seatback to pivot an angular distance within an overall range defined by the latch plate.

The latch plate further exhibits an elongated and arcuate shape terminating in a first end and an opposite second end to which are mounted fasteners for securing the latch plate in inwardly spaced fashion from an inside vehicle pillar. The latch plate also includes a plurality of spaced apart windows with the fingers seating through selected windows to establish a given position of said body along an arcuate path established by said latch plate.

The body further exhibits a pair of spaced apart plate shaped sectors, with a first plate shaped sector being smaller in dimension and mounting to a similar configured profile portion of the second sector via at least one pair of spacer fasteners. The striker extends from an exposed surface of the first plate shaped sector. Additionally, a matching and slightly arcuate track created within an interior defined between the spaced apart sectors includes upper and lower opposing guides, between which is received the latch plate.

The second plate shaped sector further includes an integrally formed and downwardly extending portion exhibiting a lower end positioned bracket to which is supported a lower disposed seating portion of the pivot element via a pivot pin. The pivot element further exhibits a generally planar shaped body terminating in a lower mating portion which seats between the bracket of the second plate shaped sector and through which the pivot pin inserts.

Additional features include a biasing spring supported about the pin and including an extending end which abuts a lower edge of the pivot element to influence the engaging fingers in a direction towards the latch plate. The spaced apart sectors each further exhibit windowed apertures which align with the windows in the latch plate. A lower angled tab edge of the second plate shaped sector supports an outer fixed sleeve associated with a cable release component, with an inner translating wire extending from the outer fixed sleeve and engaging an elevated location of the pivot element a distance above the pivot pin.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a perspective view of the latch mechanism and illustrating the arcuate latch plate with interiorly teethed window portions, the displaceable mounted body with exteriorly facing striker bar, and cable actuated and biased fingers pivotally mounted to the body for selectively engaging subset teethed window portions of the latch plate along a designated arcuate pathway;

FIG. 2 is a partially rotated perspective view of the latch mechanism in FIG. 1;

FIG. 4 is an environmental perspective partially cutaway view illustrating a seatback with striker engaging hook and further evidencing the manner in which the latch plate is secured to pillar locations associated with the vehicle interior.

DETAILED DESCRIPTION OF THE PREFERRED EMBODIMENTS

Figure 3:
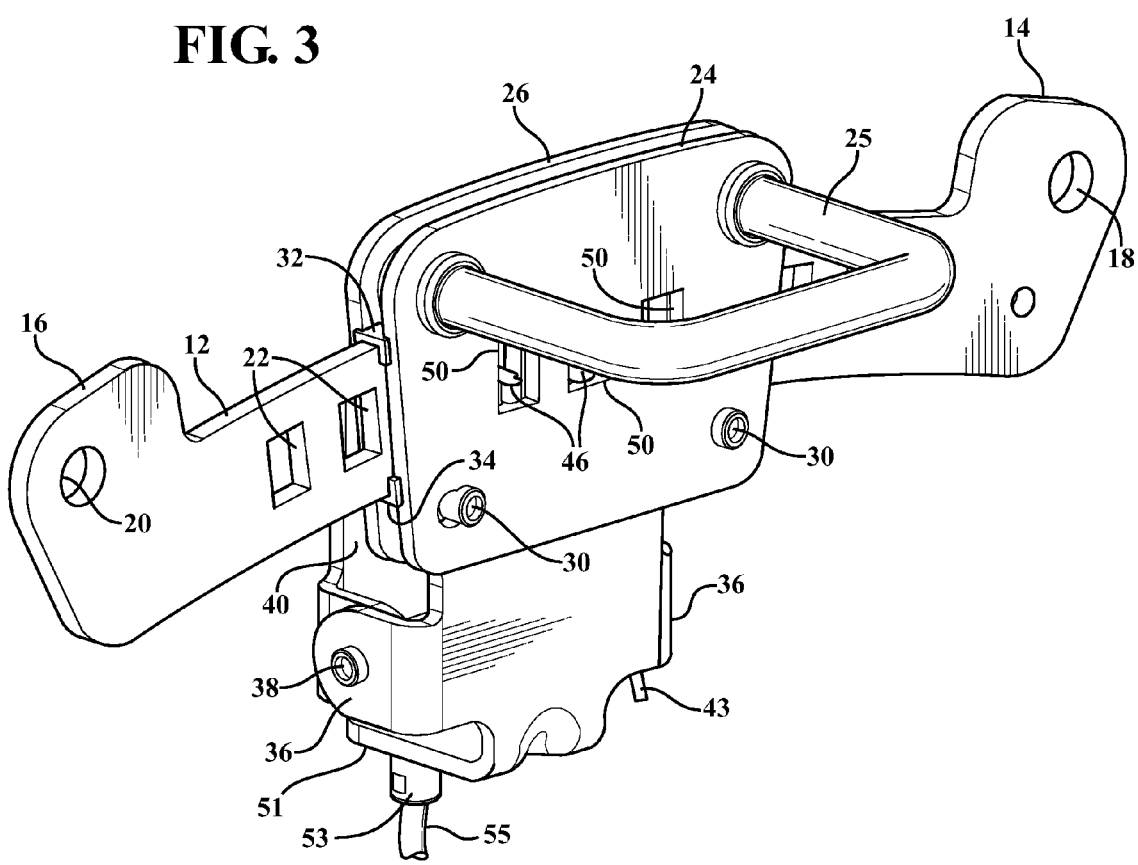
FIG. 3 is a further rotated view illustrating a back side of the latch mechanism including the seatback side engaging striker bar.

Referring to the illustrations, the present invention teaches a latch mechanism for use with such as a second row fold flat seatback. As previously described, the latch mechanism interfaces a side location of a vehicle seatback at a location above its pivot point with a fixed and inner pillar location of the vehicle in order to define a range of pivotal adjustment of the seatback when affixed to the latch. The seatback is further detachable from the latch, such as in order to permit the seat to forward dump.

Referring to FIG. 1, a first perspective view is generally shown at 10 of the latch mechanism and includes an elongated and arcuate latch plate 12, such as which exhibits an arcuate shape with a first end 14 and an opposite second end 16. Each of the ends 14 and 16 respectively include a fastener hole (see respectively at 18 and 20) through which are mounted fasteners 19 and 21 (see FIG. 4) for securing the latch plate 12 to an elevated side pillar location (see as further represented by fragmentary positions 2 and 4 in FIG. 4) which is associated with an interior of the vehicle frame.

The latch plate 12, as with the other components of the mechanism, is constructed of a durable steel or like material and further exhibits a plurality of spaced apart engaging portions, which are depicted in the illustrated embodiment by interior windows (see as illustrated at 22 by inner perimeter defining surfaces which extend at evenly spaced apart intervals along the intermediate and arcuate extending length of the latch plate 12 between the opposite ends 14 and 16. It is further understood that the mounting fasteners 19 and 21 can also include suitable spacer collars or the like for positioning the latch plate 12 any desired spatial distance from the inner surface of the vehicle pillar (again 2 and 4), this in order to provide clearance for travel by the remaining displaceable components of the mechanism as will be described.

A displaceable mounted body is provide and collectively includes a pair of spaced apart plate shaped sectors 24 and 26, with the first plate shaped sector 24 illustrated as being smaller in dimension and mounting to a similar configured profile portion of the second sector 26, such as via additional pairs of upper and lower spacer fasteners 28 and 30. A generally "U" shaped striker bar 25 extends from an exposed surface of the first plate shaped sector 24 and is secured in place as best shown in FIG. 2 by the upper illustrated fasteners 28.

As further shown in the operational view of FIG. 4, the striker 25 is engaged by a hook component, representatively depicted at 6 in one potential and non-limiting fashion, configured into an opposing and optionally inwardly recessed side location of a pivotal seatback 8 (see recess profile 7), this in order to selectively pivotally slave the seatback 8 to the mechanism. As previously described, and upon the inner hook component 6 of the seatback 8 releasing from striker bar 25, the seatback may be permitted to forwardly dump, with the striker clearing an open rear of the inner profile 7 defined in the seatback and such as to increase available storage space communicating through a trunk area (not shown) of the vehicle. Although not shown, the hook component 6 is understood to be associated with a secondary latch mechanism built into the seatback 8 and which, upon being engaged to the striker 25, causes the seatback 8 to pivot over a range equal to the spatial positions established by the windowed apertures 22 of the latch plate 12 and upon guidably displacing the plate shaped sectors 24 and 26 which are mounted about the arcuate shaped latch plate 12.

As best illustrated in each of FIGS. 1-3, a matching and slightly arcuate profile or track is created within the interior defined between the spaced apart sectors 24 and 26 and further includes the provision of upper 32 and lower 34 opposing rails or guides between which are received the upper and lower opposite surfaces of the interior secured plate 12. Although not clearly shown, the opposing rails/guides 32 and 34 each also exhibit a matching arcuate slope relative the upper and lower surfaces of the latch plate 12 in order to ensure smooth and non-resistive travel of the assembly.

The second plate shaped sector 26 as previously described is dimensionally longer than the first sector 24, such that the second sector 26 includes an integrally formed and downwardly extending portion terminating in a lower end positioned bracket (which is defined as a pair of opposite edge positioned and spaced apart tabs 36). A widthwise extending and elongated pivot pin 38 extends between the outer spaced tabs 36 and pivotally supports a pivot element 40. The pivot element 40 includes a generally planar shaped body terminating in a lower mating portion, further defined by a further pair of opposing tabs 42 which respectively align and seat between the outer positioned bracket tabs 36 of the sector 26, with the pivot pin 38 inserting widthwise through aligning apertures associated with each of the pairs of outer 36 and inner 42 tabs.

A biasing spring is illustrated at 44 and is supported about the pin 38. A first extending end 43 (see FIGS. 2 and 3) of the spring 44 abuts a lower edge of the sector 26, with a second opposite end 45 biasing against a lower edge of the pivot element 40.

In this fashion, the spring 44 influences the pivot element 40 in a rotational direction such that a plurality of angled and inwardly extending/engaging fingers 46 associated with an upper end of the pivot element 40 are caused to engage the housing at selected positions along the arcuate track of the latch plate 12. This occurs upon the fingers 46 being outwardly (in a counter biased fashion as will be described below) actuated, and the sectors 24 and 26 arcuately displaced along the track length of the latch plate 12 such that the windows 22 align with additional windowed apertures formed through each of the spaced apart and slaved plate sectors 24 and 26 (see at 48 for plate 26 in FIGS. 1 and 2, as well as at 50 in FIG. 3 for plate 24). Upon the sector windowed apertures 48 and 50 aligning with the inner sandwiched windowed apertures 22 of the mounted latch plate 12, the counter bias exerted upon the pivot element is relaxed, with the spring 44 reseating the fingers 46 through the sectors 24 and 26 and inter-disposed latch plate 12.

A further and lower most angled tab 51 is depicted extending outwardly from the second supporting plate sector 26 and includes an inwardly notched or recessed surface location, best shown at 52 for supporting and securing an outer fixed sleeve 53 associated with a cable release component. An inner translating wire 54 extends from the outer fixed sleeve 53, including lengthwise extending and fixed sheath 55, and engages an end mounting 56 in turn secured to an outwardly bent tab 57 configured from an intermediate body location of the pivot element 40, at an elevated location a given distance above the pivot pin 38.

Upon inward displacement of the wire 54 in a direction toward the outer sleeve 52 as shown by arrow 58 in FIG. 4 (and further such as can be initiated by a remote located lever 60 from which an opposite end of the inner translating wire 54 is communicated via the fixed sheath 55) operates to overcome the force of the spring 44 biasing the pivot element 40 towards the sectors 24 and 26, and to outwardly rotate and disengage the upper angled fingers 48 from their selected window teethed locations in the sector plates 24 and 26 and inner latch plate 12. At this point, the slaved seatback 8 to pivot an angular distance within an overall range equivalent to the length of the teethed sector (e.g. at any incremental location defined by the spaced apart windows 22 associated with the latch plate 12).

Without limitation, the length and positioning of the latch plate 12 is not limited by that depicted in the illustrations, and can either be lengthened or shortened as desired to corresponding to any desired range of seatback positioning. It is further envisioned that, as opposed to both the first and second sectors 24 and 26 exhibiting aligning windowed apertures 48 and 50, the sector 24 can be a solid piece, with the fingers 46 reconfigured (shortened) such that they only seat through selectively aligning window apertures 48 associated with second sector 26 and like apertures 22 associated with the fixed latch plate 12. As further previously described, the hook component 6 (or any other suitable engagement structure incorporated into the elevated side location established in the seatback) can be manipulated, such as further by any type of independent latching structure integrated into the seat, and so that the seatback can be disengaged from the striker bar 25 and permitted to forward dump.

Having described our invention, other and additional preferred embodiments will become apparent to those skilled in the art to which it pertains, and without deviating from the scope of the appended claims.

I claim:

1. A recline mechanism incorporated into a rear row seat of a vehicle, comprising:
    a latch plate adapted to being fixed to an interior location of the vehicle;
    said latch plate further having an elongated and arcuate shape terminating in a first end and an opposite second end to winch are mounted fasteners for securing said latch plate in inwardly spaced fashion from an inside vehicle pillar, said latch plate further having a plurality of spaced apart windows;
    a body supported in displaceable fashion along locations associated with said latch plate, said body exhibiting an outwardly facing striker adapted to being engaged by a component configured into an opposing side location of a pivotal seatback to pivotally slave the seatback to said displaceable body;
    said body further having a pair of spaced apart plate shaped sectors, a first plate shaped sector being smaller in dimension and mounting to a similar configured profile portion of said second sector via at least one pair of spacer fasteners;
    a matching and slightly arcuate track created within an interior defined between said spaced apart sectors and including upper and lower opposing guides between which is received said latch plate;
    said spaced apart sectors each further having windowed apertures which align with said windows in said latch plate; and
    a cable release component supported on said body and operating to actuate a pivot element exhibiting biased fingers supported on said body and seating through selected windows to establish a given position of said body along an arcuate path established by said latch plate, said cable release component operable to withdraw said fingers from engagement with said latch plate and to permit the seatback to pivot an angular distance within an overall range defined by said latch plate.

2. The invention as described in claim 1, further comprising said striker extending from an exposed surface of said first plate shaped sector.

3. The invention as described in claim 1, said second plate shaped sector further comprising a pair of outwardly extending tabs between which is pivotally supported said pivot element via a pivot pin.

4. The invention as described in claim 3, further comprising a lower angled tab edge of said second plate shaped sector supporting an outer fixed sleeve associated with a said cable release component, an inner translating wire extending from said outer fixed sleeve and engaging an elevated location of said pivot element a distance above said pivot pin.

5. The invention as described in claim 3, said pivot element further comprising a generally planar shaped body terminating in a further pair of tabs seating between said tabs of said second plate shaped sector and through which said pivot pin inserts.

6. The invention as described in claim 5, further comprising a biasing spring supported about said pin and including first and second ends abutting a lower edges of each of said pivot element and second plate shaped sector to influence said fingers in a direction towards said latch plate.

7. The invention as described in claim 1, said second plate shaped sector further comprising a pair of outwardly extending tabs between which is pivotally supported said pivot element via a pivot pin.

8. The invention as described in claim 7, further comprising a lower angled tab edge of said second plate shaped sector supporting an outer fixed sleeve associated with a said cable release component, an inner translating wire extending from said outer fixed sleeve and engaging an elevated location of said pivot element a distance above said pivot pin.

9. The invention as described in claim 7, said pivot element further comprising a generally planar shaped body terminating in a further pair of tabs seating between said tabs of said second plate shaped sector and through which said pivot pin inserts.

10. The invention as described in claim 9, further comprising a biasing spring supported about said pin and including first and second ends abutting a lower edges of each of said pivot element and second plate shaped sector to influence said fingers in a direction towards said latch plate.

11. A recline mechanism incorporated into a rear row seat of a vehicle, comprising:
    a latch plate adapted to being fixed to an interior location of the vehicle;
    said latch plate further having an elongated and arcuate shape terminating in a first end and an opposite second end to which are mounted fasteners for securing said latch plate in inwardly spaced fashion from an inside vehicle pillar;
    said latch plate further having a plurality of spaced apart windows;
    a body supported in displaceable fashion along locations associated with said latch plate, said body exhibiting an outwardly facing striker adapted to being engaged by a component configured into an opposing side location of a pivotal seatback to pivotally slave the seatback to said displaceable body;
    said body further having a pair of spaced apart plate shaped sectors, a first plate shaped sector being smaller in dimension and mounting to a similar configured profile portion of said second sector via at least one pair of spacer fasteners;
    said second plate shaped sector further comprising a pair of outwardly extending tabs between which is pivotally supported a pivot element via a pivot pin;
    a lower angled tab edge of said second plate shaped sector supporting an outer fixed sleeve associated with a cable release component supported on said body, an inner translating wire extending from said outer fixed sleeve and engaging an elevated location of said pivot element a distance above said pivot pin; and
    said cable release component operating to actuate a said pivot element and exhibiting biased fingers supported on said body and seating through selected windows to establish a given position of said body along an arcuate path established by said latch plate, said cable release component operable to withdraw said fingers from engagement with said latch plate and to permit the seatback to pivot an angular distance within an overall range defined by said latch plate.

12. A recline mechanism incorporated into a rear row seat of a vehicle, comprising:

an elongated and arcuate latch plate terminating at first and second ends and secured in inwardly spaced fashion to an elevated interior location of a vehicle pillar, said latch plate further comprising a plurality of window apertures extending at spaced apart locations between said first and second ends;

a body supported in displaceable fashion along said latch plate and including at least one additional plurality of window apertures, said body exhibiting an outwardly facing striker adapted to being engaged by a component configured into an opposing side location of a pivotal seatback to pivotally slave the seatback to said displaceable body;

said body further having a pair of spaced apart plate shaped sectors, a first plate shaped sector being smaller in dimension and mounting to a similar configured profile portion of a second sector via at least one pair of spacer fasteners;

a matching and slightly arcuate track created within an interior defined between said spaced apart sectors and including upper and lower opposing guides between which is received said latch plate;

said additional plurality of window apertures in said body being defined in each of said spaced apart sectors and which align with said plurality of window apertures in said latch plate; and a cable release component supported on said body and operating to actuate a pivot element mounted in biasing fashion to said body, said pivot element exhibiting inwardly angled fingers seating through aligning window apertures associated with said latch plate and body and, upon being outwardly displaced from engagement with said latch plate, permitting the seatback to pivot an angular distance within an overall range defined by said latch plate following which said fingers reseat through further selected window apertures associated with said latch plate.

13. The invention as described in claim 12, further comprising said striker extending from an exposed surface of said first plate shaped sector.

14. A recline mechanism incorporated into a rear row seat of a vehicle, comprising:

an elongated and arcuate latch plate terminating at first and second ends and secured in inwardly spaced fashion to an elevated interior location of a vehicle pillar, said latch plate further comprising a plurality of window apertures extending at spaced apart locations between said first and second ends;

a body supported in displaceable fashion along said latch plate and including at least one additional plurality of window apertures, said body exhibiting an outwardly facing striker adapted to being engaged by a component configured into an opposing side location of a pivotal seatback to pivotally slave the seatback to said displaceable body;

said body further having a pair of spaced apart plate shaped sectors, a first plate shaped sector being smaller in dimension and mounting to a similar configured profile portion of a second sector via at least one pair of spacer fasteners;

a matching and slightly arcuate track created within an interior defined between said spaced apart sectors and including upper and lower opposing guides between which is received said latch plate;

said second plate shaped sector further having a pair of outwardly extending tabs between which is pivotally supported said a pivot element via a pivot pin;

a lower angled tab edge of said second plate shaped sector supporting an outer fixed sleeve associated with a cable release component supported upon said body, an inner translating wire extending from said outer fixed sleeve and engaging an elevated location of said pivot element a distance above said pivot pin; and a said cable release component operating to actuate said pivot element mounted in biasing fashion to said body, said pivot element exhibiting inwardly angled fingers seating through aligning window apertures associated with said latch plate and body and, upon being outwardly displaced from engagement with said latch plate, permitting the seatback to pivot an angular distance within an overall range defined by said latch plate following which said fingers reseat through further selected window apertures associated with said latch plate.

* * * * *

UNITED STATES PATENT AND TRADEMARK OFFICE
CERTIFICATE OF CORRECTION

| | | |
|---|---|---|
| PATENT NO. | : 8,506,014 B2 | Page 1 of 1 |
| APPLICATION NO. | : 13/010832 | |
| DATED | : August 13, 2013 | |
| INVENTOR(S) | : Stephen C. Bruck | |

It is certified that error appears in the above-identified patent and that said Letters Patent is hereby corrected as shown below:

In the Specification

Column 5, line number 19, the word "winch" should be "which".

Signed and Sealed this
Twenty-fourth Day of June, 2014

Michelle K. Lee
*Deputy Director of the United States Patent and Trademark Office*